(12) United States Patent
Shim et al.

(10) Patent No.: US 10,775,485 B2
(45) Date of Patent: Sep. 15, 2020

(54) LIDAR DEVICE AND SYSTEM COMPRISING THE SAME

(71) Applicant: KOREA ELECTRONICS TECHNOLOGY INSTITUTE, Seongnam-si, Gyeonggi-do (KR)

(72) Inventors: Young Bo Shim, Seoul (KR); Yeon Kug Moon, Hanam-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 248 days.

(21) Appl. No.: 15/814,131

(22) Filed: Nov. 15, 2017

(65) Prior Publication Data
US 2019/0120938 A1 Apr. 25, 2019

Related U.S. Application Data

(63) Continuation of application No. PCT/KR2017/012756, filed on Nov. 10, 2017.

(30) Foreign Application Priority Data

Oct. 20, 2017 (KR) .......................... 10-2017-0136198

(51) Int. Cl.
*G01C 3/08* (2006.01)
*G01S 7/481* (2006.01)
(Continued)

(52) U.S. Cl.
CPC .......... *G01S 7/4817* (2013.01); *G01S 7/4814* (2013.01); *G01S 7/4816* (2013.01); *G01S 17/42* (2013.01);
(Continued)

(58) Field of Classification Search
CPC ........ G01S 17/89; G01S 7/4817; G01S 17/87; G01S 7/4811; G01S 7/4812;
(Continued)

(56) References Cited

U.S. PATENT DOCUMENTS

| 4,916,536 A * | 4/1990 | Kerr ...................... G01S 7/4811 348/139 |
| 9,086,273 B1 | 7/2015 | Gruver et al. |

(Continued)

OTHER PUBLICATIONS

International Search Report of corresponding Patent Application No. PCT/KR2017/012756—3 pages (dated Jul. 20, 2018).
(Continued)

*Primary Examiner* — Isam A Alsomiri
*Assistant Examiner* — Amir J Askarian
(74) *Attorney, Agent, or Firm* — Knobbe, Martens, Olson & Bear, LLP (57) ABSTRACT

The described technology relates to a light detection and ranging (LIDAR) device. The LIDAR device can include a transmitter configured to emit an optical signal, a first lens section configured to convert the optical signal into collimated light, a reflector configured to adjust a direction of the converted optical signal, a second lens section configured to allow the adjusted optical signal to have the same focal plane even though a reflection angle of the reflector is varied and a third lens section configured to convert the optical signal passed through the second lens section into collimated light. The LIDAR device can also include a fourth lens section configured to allow the optical signal, and a receiver configured to receive the optical signal passed through the fourth lens section. The third lens section and the fourth lens section are positioned on the same line in a first direction.

14 Claims, 8 Drawing Sheets

(51) Int. Cl.
*G02B 26/08* (2006.01)
*G02B 13/00* (2006.01)
*G01S 17/42* (2006.01)

(52) U.S. Cl.
CPC ....... *G02B 13/004* (2013.01); *G02B 26/0833* (2013.01)

(58) Field of Classification Search
CPC ...... G01S 7/4815; G01S 7/4816; G01S 17/42; G01S 17/58; G01S 17/88; G01S 17/936; G01S 17/95; G01S 7/481; G01S 7/4814; G01S 7/4917; G01S 7/4972; A61B 3/102; A61B 3/1225; A61B 3/0025; A61B 3/1025; A61B 3/103; A61B 3/117; A61B 3/14; G02B 13/0005; G02B 13/22; G02B 9/60; G02B 13/004; G02B 13/0045; G02B 13/14; G02B 13/16; G02B 19/0028; G02B 19/0066; G02B 26/005; G02B 26/10; G02B 26/101; G02B 26/103; G02B 26/105; G02B 26/127; G02B 27/0031; G02B 27/09; G02B 27/2214; G02B 27/42; G02B 3/0056; G02B 3/0081; G02B 3/14; G02B 5/005; G02B 5/122; G02B 5/208; G02B 5/28; G02B 7/008; G02B 9/62; G02B 9/64; G02B 26/0833; G01B 11/24; H04N 13/218; H04N 13/395; Y02A 90/19
See application file for complete search history.

(56) References Cited

U.S. PATENT DOCUMENTS

| | | |
|---|---|---|
| 2006/0011840 A1 | 1/2006 | Bryce et al. |
| 2010/0045965 A1 | 2/2010 | Meneely |
| 2012/0026497 A1 | 2/2012 | Mathur et al. |
| 2012/0097834 A1* | 4/2012 | Lin .................... G02B 13/0005 250/201.1 |
| 2015/0055117 A1 | 2/2015 | Pennecot et al. |
| 2016/0282453 A1* | 9/2016 | Pennecot ............. G01S 7/4972 |
| 2018/0180718 A1* | 6/2018 | Lin ....................... G01S 7/4811 |
| 2018/0188359 A1* | 7/2018 | Droz ....................... G01S 7/497 |
| 2018/0224530 A1* | 8/2018 | Ishikawa ................. G01S 17/89 |
| 2018/0231640 A1* | 8/2018 | Han ...................... G01S 7/4811 |
| 2018/0238794 A1* | 8/2018 | Kangas ................. G01J 3/0286 |
| 2018/0267148 A1* | 9/2018 | Buettner ................. G01S 17/42 |
| 2018/0312125 A1* | 11/2018 | Jung .................... G01S 17/023 |
| 2018/0348344 A1* | 12/2018 | Wyrwas ............... G01S 7/4816 |
| 2019/0025431 A1* | 1/2019 | Satyan .................. G01S 7/4914 |
| 2019/0079171 A1* | 3/2019 | Hwang .................. G01S 17/42 |

OTHER PUBLICATIONS

Written Opinion of corresponding Patent Application No. PCT/KR2017/012756—4 pages (dated Jul. 20, 2018).

* cited by examiner

LIDAR DEVICE AND SYSTEM COMPRISING THE SAME

INCORPORATION BY REFERENCE TO ANY PRIORITY APPLICATIONS

This application is a continuation application, and claims the benefit under 35 U.S.C. §§ 120 and 365 of PCT Application No. PCT/KR2017/012756, filed on Nov. 10, 2017, which is hereby incorporated by reference. PCT/KR2017/012756 also claimed priority from Korean Patent Application No. 10-2017-0136198 filed on Oct. 20, 2017, which is hereby incorporated by reference.

BACKGROUND

Field

Embodiments relate to a light detection and ranging (LIDAR) device and an LIDAR system including the same.

Description of the Related Technology

LIDAR is one of remote detection and ranging devices which can measure physical properties of an object, for example, a distance, a direction, a speed, a temperature, a material distribution, a concentration characteristic, etc. by emitting light, for example, a laser beam to the object and analyzing the light reflected from the object. The LIDAR utilizes advantages of a laser capable of generating a pulse signal having high energy density and a short period and thus measures the physical properties of the object more accurately.

The LIDAR has been used in various fields such as 3D image acquisition, meteorological observation, speed or distance measurement of an object, autonomous driving, etc. by using a laser light source having a specific wavelength or a laser light source having a variable wavelength as a light source. For example, the LIDAR has been used in precise atmospheric analysis and global environment observation when mounted on an aircraft, a satellite, etc., and used as a means for complementing a camera function such as measurement of a distance from an object when mounted on a spacecraft and an exploration robot.

Further, LIDAR sensing techniques has been terrestrially commercialized in simple forms for measuring a remote distance, checking the speed of vehicles, and the like. Recently, the LIDAR has been utilized in a laser scanner or a 3D camera and applied to 3D reverse engineering, unmanned vehicles, and the like.

In addition, the LIDAR has recently been developed to recognize spatial information while being rotated 360 degrees. However, an LIDAR device is limited in that a mechanical defect such as wear, a gap, etc. is present due to mechanical rotation of a motor or the like, and it is thus difficult to apply the LIDAR device to autonomous driving directly related to human life.

SUMMARY

Embodiments provide an LIDAR device applicable to a vehicle and a mobile.

Further, an LIDAR device and an LIDAR system improved in optical efficiency are provided.

Further, an LIDAR device, which is small and lightweight and improved in durability, is provided.

Further, an LIDAR device, which has only an optical structure to scan a space without mechanical rotation, is provided.

One aspect of the present disclosure provides a light detection and ranging (LIDAR) device including: a transmitter configured to emit an optical signal; a first lens section configured to convert the optical signal into collimated light; a reflector configured to adjust a direction of the converted optical signal; a second lens section configured to allow the adjusted optical signal to have the same focal plane even though a reflection angle of the reflector is varied; a third lens section configured to convert the optical signal passed through the second lens section into collimated light; a fourth lens section configured to allow the optical signal, which has been passed through the third lens section and reflected from an object, to be passed therethrough; and a receiver configured to receive the optical signal passed through the fourth lens section, wherein the third lens section and the fourth lens section are positioned on the same line in a first direction, wherein the first direction is perpendicular to a second direction, and wherein the second direction includes a direction from the third lens section toward the object.

The fourth lens section may increase an angle of the optical signal passed through the third lens section.

The optical signal may include collimated light between the first lens section and the second lens section, between the third lens section and the object, and between the object and the fourth lens section.

The optical signal may have a first path as a path in the second lens section and a second path as a path in the fourth lens section, and the first path and the second path may be parallel with the second direction.

The first path and the second path may be opposite in a direction of the optical signal.

The receiver includes a channel section configured to receive an optical signal passed through the fourth lens section; and an operation section configured to calculate a distance from the object based on the optical signal received in the channel section.

The channel section may be positioned on the same focal plane.

The channel section may include a plurality of channels including a plurality of light receiving elements.

The operation section may receive the optical signal passed through the fourth lens section by selecting the plurality of channels corresponding to the direction of the reflector.

The LIDAR device may further include a focuser positioned on the same focal plane.

A tilting angle of the reflector may be adjusted to compensate optical aberration.

The reflector may include a microelectromechanical system (MEMS) mirror.

Another aspect of the present disclosure provides a light detection and ranging (LIDAR) system including an LIDAR device for scanning a plurality of areas, the LIDAR device including: a transmitter configured to emit an optical signal; a first lens section configured to convert the optical signal into collimated light; a reflector configured to adjust a direction of the converted optical signal; a second lens section configured to allow the adjusted optical signal to have the same focal plane even though a reflection angle of the reflector is varied; a third lens section configured to convert the optical signal passed through the second lens section into collimated light; a fourth lens section configured to allow the optical signal, which has been passed through the third lens section and reflected from an object, to be passed therethrough; and a receiver configured to receive the optical signal passed through the fourth lens section, wherein the third lens section and the fourth lens section are positioned on the same line in a first direction, wherein the first direction is perpendicular to a second direction, and wherein the second direction includes a direction from the third lens section toward the object.

According to embodiments, it is possible to implement an LIDAR device in a form applicable to a vehicle and a mobile.

Further, it is also possible to manufacture an LIDAR device improved in optical efficiency and having an improved scan angle.

Further, it is also possible to manufacture an LIDAR device which is small, lightweight and improved in durability.

Further, it is also possible to manufacture an LIDAR device which compensates for a mechanical defect and the like because only an optical structure is sufficient to scan a space without mechanical rotation.

Various beneficial merits and effects of the present disclosure are not limited to the foregoing description, and will be more easily understood through the detailed description about embodiments of the present disclosure.

DETAILED DESCRIPTION

Since the present disclosure may be variously modified and include many embodiments, exemplary embodiments will be described with reference to the accompanying drawings. However, these are not intended to limit the present disclosure to the specific embodiments, and it will be appreciated that all changes, equivalents and substitutes can be made without departing from the spirit and scope of the present disclosure.

It will be understood that, although the terms "first," "second," etc. may be used herein to describe various elements, these elements should not be limited by these terms. These terms are only used to distinguish one element from another. For example, a second element could be named a first element, and, similarly, the first element could be named the second element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms "comprise," or "include" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined here.

Hereinafter, embodiments will be described in detail with reference to the accompanying drawings, in which like or corresponding elements, regardless of reference numeral, are assigned with like reference numerals, and repetitive descriptions thereof will be omitted.

Figure 1:
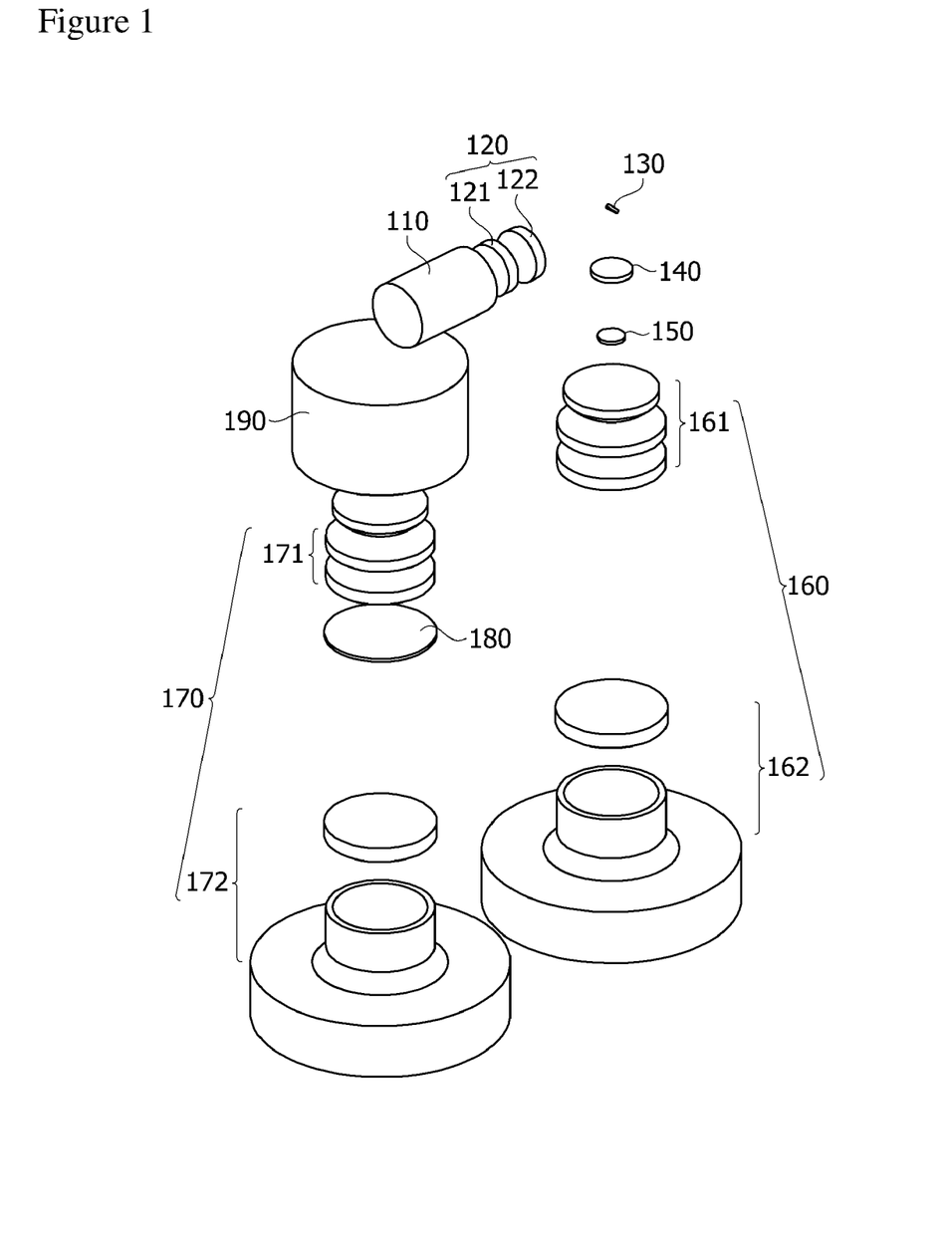
FIG. 1 is an exploded perspective view of an LIDAR device according to one embodiment.
Figure 2:
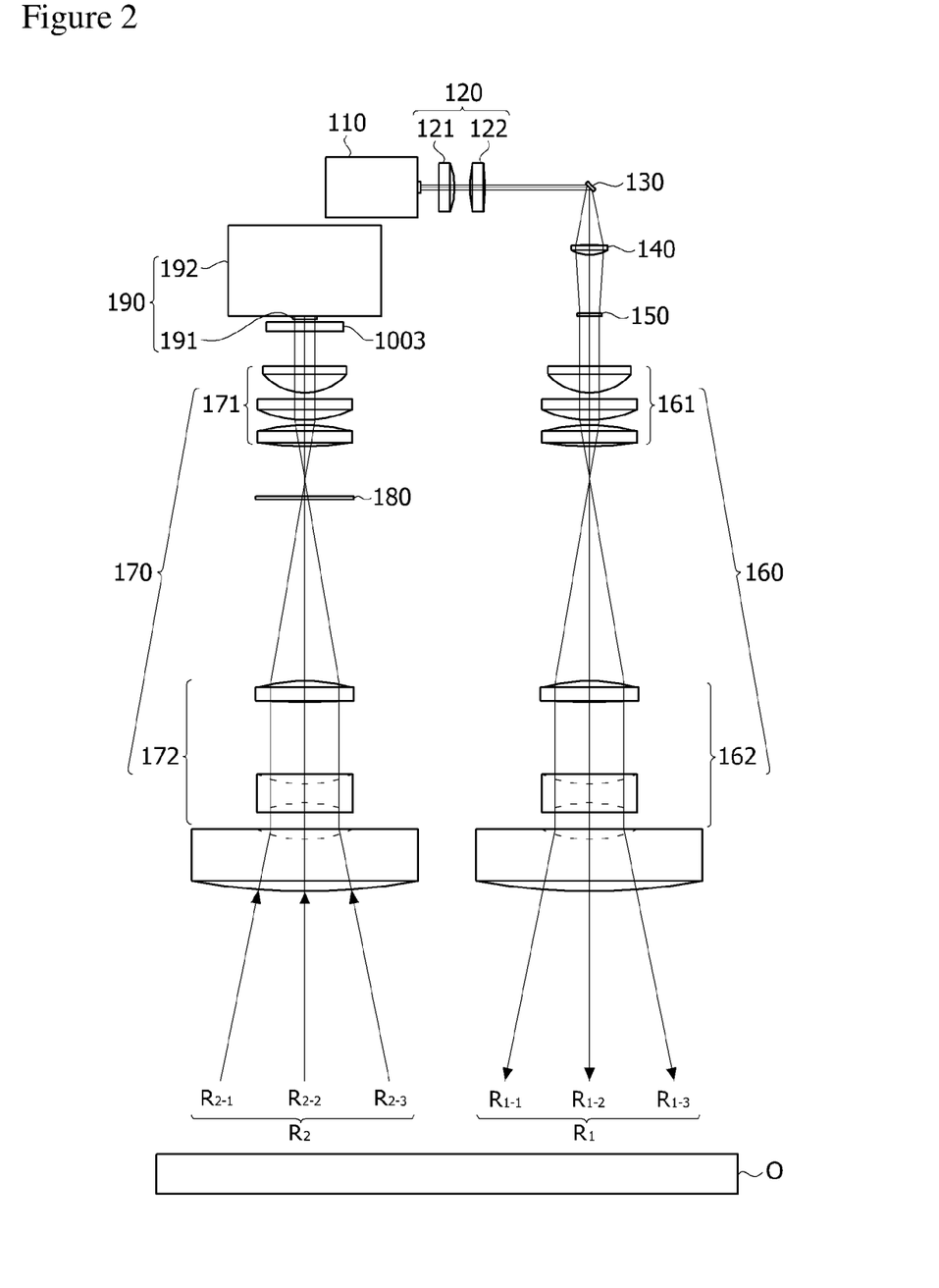
FIG. 2 is a cross-sectional view of the LIDAR device according to one embodiment when transmitting and receiving light.

FIG. 1 is an exploded perspective view of an LIDAR device according to one embodiment, and FIG. 2 is a cross-sectional view of the LIDAR device according to one embodiment when transmitting and receiving light.

Referring to FIG. 1 and FIG. 2, the LIDAR device 10 according to one embodiment may include a transmitter 110, a first lens section 120, a reflector 130, a second lens section 140, a focuser 150, a third lens section 160, a fourth lens section 170, an aperture 180, and a receiver 190.

First, the transmitter 110 may output laser pulse light, and the transmitter 110 may include a laser diode (LD). Further, the transmitter 110 may output light having various wavelengths. By way of example, the light output from the transmitter 110 may have a shorter wavelength than a radio frequency (RF). With this configuration, the transmitter 110 emits light having energy and thus the receiver receives reflected light having high energy. Thus, the LIDAR device may be used in utilizing 3D spatial information since spatial information of high resolution is obtained. Hereinafter, the light emitted from the transmitter 110 will be called a first signal.

The first lens section 120 may convert the first signal of the transmitter 110 into collimated light. For example, the first lens section 120 may include a collimator lens. In addition, the first lens section 120 may include a plurality of lenses. As shown in FIG. 1 and FIG. 2, the first lens section 120 may include a 1-1 lens 121 and a 1-2 lens 122. In addition, as described above, light passed through the 1-1 lens 121 and the 1-2 lens 122 may be collimated light. For example, the first signal may be collimated light after passing through the 1-2 lens 122.

Here, collimated light refers to light of which rays are parallel on an optical path. Therefore, the first lens section 120 may be arranged on the optical path of the light emitted from the transmitter 110. However, there are no limits to this position. Alternatively, the first lens section 120 may be arranged on an optical path changed by a reflection member added between the transmitter 110 and the first lens section 120. Thus, the first lens section 120 is not limited to such a position.

The reflector 130 may be arranged on the optical path of the first signal passed through the first lens section 120. In addition, the reflector 130 may adjust the optical path of the first signal. The reflector 130 may reflect the first signal in a direction perpendicular to an incident direction of the first signal passed through the first lens section 120. However, there are no limits to such a reflection angle, and the reflection angle may vary depending on conditions to which the LIDAR device 10 according to one embodiment is applied. In the following description, the reflection angle may vary depending on a tilting angle.

The light incident upon the reflector 130 may be collimated light, and the light reflected and output from the reflector 130 may be collimated light. The reflector 130 may include a microelectromechanical system (MEMS) mirror. For example, the reflector 130 may include a mirror plate (not shown) and a driver (not shown).

The mirror plate (not shown) may be tilted at a predetermined angle. The mirror plate (not shown) may be arranged on the optical path of the first signal passed through the first lens section 120 and reflect the first signal in various directions according to the tilting angle. The mirror plate (not shown) may have a size of 1 mm 2 to 25 mm 2, but is not limited thereto. Further, the mirror plate (not shown) may have a maximum tilting angle of 20 degrees. In this case, collimated light may be incident upon the mirror plate (not shown) so that divergence of light can be prevented when transmitting/receiving the light, thereby improving optical efficiency.

In the reflector 130, the mirror plate (not shown) may be tilted at a predetermined angle by operation of a driver 142. In the reflector 130, the optical path of the collimated light may be variously changed by the driver 142.

The mirror plate (not shown) may be tilted by electromagnetic force but not by a mechanical method. The mirror plate (not shown) may be tilted in a form of a sinusoidal wave with respect to time, so that sinusoidal spherical aberration of light incident on the receiver 190 can be compensated with respect to the time axis.

The second lens section 140 may be arranged on a path of light reflected from the reflector 130. The second lens section 140 may refract the first signal reflected from the reflector 130 so as to have the same focal plane. For example, the second lens section 140 may include an F-theta lens.

The second lens section 140 may refract the collimated light so it is focused. In addition, the light passed through the second lens section 140 may not be collimated light, but may have a parallel optical path. For example, the light incident on the second lens section 140 may be collimated light, but the light passed through the second lens section 140 may not be collimated light but light having a parallel optical path.

That is, although the light passed though the second lens section 140 is not collimated light, there is no change in a traveling direction (for example, a traveling angle of the light) even though the tilting angle of the reflector 130 is changed. Accordingly, it is possible to have the same effects as the transmitter for generating an optical signal is moved physically parallel. That is, the LIDAR device according to one embodiment can provide various traveling paths for an optical signal by optically parallel movement of the transmitter. The second lens section 140 may enable the light reflected from the reflector 130 and having various paths to be focused on the same plane.

For example, the second lens section 140 may form focal points separated according to scan angles on the same plane.

That is, the first signal incident on the second lens section 140 is the light reflected from the reflector 130 and a state of very high optical efficiency may be maintained until widening the scan angle of the collimated light since the first signal has an optical area as small as the size of the reflector 130. In addition, the second lens section 140 may form focal distances separated according to the scan angles so that high optical efficiency can be maintained while widening the scan angle of the first signal passed through the reflector 130 with respect to the object. That is, the light passed through the second lens section 140 is not focused on a certain area but variously displaced according to the angles of the reflector 130 without optical loss.

The focuser 150 may be arranged on a focal point at which the light passed through the second lens section 140 is focused. The light may be emitted to the third lens section 160 by the focuser 150 while having a parallel optical path again. The focuser 150 may be arranged between the second lens section 140 and the third lens section 160, and closer to the second lens section 140 than the third lens section 160. Therefore, it is possible to improve the scan angle by widening the total angle of the light incident upon the third lens section 160. Here, the scan angle refers to an angle the light passed through the third lens section 160 and traveling toward an object can have.

The third lens section 160 converts the first signal passed through the focuser 150 into collimated light again. Thus, the first signal passed through the third lens section 160 may be collimated light. The third lens section 160 may include a telecentric lens.

The third lens section 160 may include a 3-1 lens section 161 and a 3-2 lens section 162. The 3-1 lens section 161 and the 3-2 lens section 162 may include a plurality of lenses. In addition, the 3-1 lens section 161 may be a convex lens. Thus, the 3-1 lens section 161 may condense the light incident upon the third lens section 160. In addition, the 3-2 lens section 162 may include a concave lens. Thus, the 3-2 lens section 162 may disperse the light incident on the third lens section 160. With this configuration, the LIDAR device 10 according to one embodiment may be manufactured compactly, and effectively improved in the scan angle.

As described above, the focuser 150 is closer to the second lens section 140 than the third lens section 160, so that the area of the first signal incident upon the third lens section 160 can be greater than the area of the first signal exiting the second lens section 140. With this configuration, the light incident upon the second lens section 140 has a smaller incident area than the light incident upon the third lens section 160. Further, both the light incident on the second lens section 140 and the light passed through the third lens section 160 may be collimated light, and the collimated light incident on the second lens section 140 may have a wider optical angle than the collimated light passed through the third lens section 160. In addition, the light passed through the third lens section 160 may have an increased wide angle while passing through the fourth lens section 170, and thus a scan angle of 120° or higher is provided.

The fourth lens section 170 may be positioned at the same distance from an object O as the third lens section 160. That is, the fourth lens section 170 may be positioned at the same position in a direction (i.e., a second direction) perpendicular to a direction (i.e., a first direction) from the object O toward the the third lens section 160. The second direction may be the same as a direction from the second lens section 140 toward the object O. The fourth lens section 170 may include a 4-1 lens section 171 and a 4-2 lens section 172. The 4-1 lens section 171 may be separated from the object O in the first direction at the same distance by which the 3-1 lens section 161 is separated from the object O in the first direction Likewise, the 4-2 lens section 172 may be separated from the object O in the first direction at the same distance by which the 3-2 lens section 162 is separated from the object O in the first direction.

Further, the 3-1 lens section 161 and the 4-1 lens section 171 may be positioned on the same straight line in the second direction Likewise, the 3-2 lens section 162 and the 4-2 lens section 172 may be arranged on the same straight line in the second direction. Therefore, the LIDAR device according to one embodiment includes the third lens section 160 and the fourth lens section 170, which have identical lenses, and the third lens section 160 and the fourth lens section 170 are arranged at the same positions, thereby reducing manufacturing costs and the receiver may selectively receive an optical signal via the same optical path. Thus, it is possible to reduce power consumption for receiving light in the receiver.

The fourth lens section 170 may include the 4-1 lens section 171 and the 4-2 lens section 172. The 4-1 lens section 171 and the 4-2 lens section 172 may include a plurality of lenses. In addition, the 4-1 lens section 171 may include a convex lens. Thus, the 4-1 lens section 171 may condense light incident to the fourth lens section 170. In addition, the 4-2 lens section 172 may include a concave lens. Thus, the 4-2 lens section 172 may disperse the light incident on the fourth lens section 170. With this configuration, the LIDAR device 10 according to one embodiment may be manufactured compactly, and the scan angle may be effectively improved.

The fourth lens section 170 may be a wide angle lens like the third lens section 160. With this configuration, the fourth lens section 170 may widen the angle of the first signal reflected from the object O with respect to an optical axis. If the reflector is not tilted, the optical axis for the fourth lens section 170 refers to the optical path from the fourth lens section 170 toward the object O, and the optical axis for the third lens section 160 refers to the optical path from the third lens section 160 toward the object O.

That is, the light may have diversified optical paths according to various tilting angles of the reflector 130, and the light having the diversified optical paths may have a wide scan range since the wide angle becomes larger while passing through the third lens section 160, and a receiving range, as wide as the scan range, from the object O in the fourth lens section 170 may be provided.

By way of example, a first signal R1 toward the object O may include a 1-1 signal R1-1, a 1-2 signal R1-2, and a 1-3 signal R1-3. Here, the 1-2 signal R1-2 may be the first signal R1 of the same axis as the optical axis. The 1-2 signal R1-2 may be light emitted to the object O when the reflector 130 has a tilting angle of 0 degrees. Further, the 1-1 signal R1-1 may be the first signal R1 having the narrowest angle with respect to the optical axis. In addition, the 1-3 signal R1-3 may be the first signal R1 having the widest angle with respect to the optical axis. In this case, the reflector 130 may have the maximum tilting angle. By way of example, the 1-1 signal R1-1 may be the light emitted from the LIDAR device 10 toward the object O when the reflector 130 is tilted as much as −6 degrees, and the 1-3 signal R1-3 may be the light when the reflector 130 is tilted as much as +6 degrees.

Further, the light scattered and reflected from the object O may have the same optical path as the optical path that the light emitted to the object O and parallelly moved in the first direction has. Light received in the receiver 190 among the light reflected and scattered from the object O will be called the second signal R2.

Likewise, the second signal R2 may include a 2-1 signal R2-1, a 2-2 signal R2-2, and a 2-3 signal R2-3. The 2-1 signal R2-1 may be light acquired by reflecting the 1-1 signal R1-1 from the object O, the 2-2 signal R2-2 may be light acquired by reflecting the 1-2 signal R1-2 from the object O, and the 2-3 signal R2-3 may be light acquired by reflecting the 1-3 signal R1-3 from the object O.

The second signal R2 may be incident on the fourth lens section 170 and may be collimated light. The incident light may have an optical path acquired by parallelly moving the optical path of the third lens section 160 in the second direction, and may be focused on the parallelly-moved optical path. In addition, like the first signal, a plurality of focal points according to the scan angle may be formed on a channel section 191 of the receiver 190, which will be described below.

The aperture 180 may be arranged in between the 4-1 lens section 171 and the 4-2 lens section 172. The aperture 180 may control the amount of light to be uniform according to the angle of the reflector 130. With this configuration, the LIDAR device 10 according to one embodiment provides an image improved in resolution because the amount of light is uniform.

The receiver 190 may receive light emitted from the transmitter 110 and then reflected or scattered from the object O. The receiver 190 is adjacent to the transmitter 110, and therefore the LIDAR device 10 according to one embodiment can reduce the loss of light and improve optical efficiency.

The receiver 190 may include the channel section 191 and an operation section 192. The channel section 191 may receive the light passed through the fourth lens section 170. For example, the channel section 191 may consist of multiple channels, and thus the receiving channel may vary depending on the angle of the reflector 130. The channel section 191 may be positioned on the same straight line as the focuser 150 in the second direction. That is, the channel section 191 may be arranged at a back focal length of the fourth lens section 170. Accordingly, the LIDAR device 10 according to one embodiment detects the size of a real image of the focuser 150, and enlarges the size of each channel in the channel section 191 so as to be greater than the size of the real image corresponding to each light beam of the focuser 150, thereby improving receiving efficiency. Detailed descriptions will be made below with reference to FIG. 7 and FIG. 8.

The receiver 190 may transmit a signal corresponding to a laser beam received in the channel section 191 to the operation section 192. The operation section 192 calculates a distance between the LIDAR device 10 and the object O by using a signal received from the LIDAR device 10. For instance, the operation section 192 may calculate a distance between the LIDAR device 10 and the object O based on time of flight (TOF) by using the time taken until the laser beam reflected from the object O returns to the receiver 190 after the transmitter 110 outputs the laser beam. Alternatively, the operation section 192 may calculate a distance between the LIDAR device 10 and the object O based on a phase shift (PS) by using a phase of a signal reflected from the object O and returning to the receiver 190 after the transmitter 110 emits the laser beam continuously modulated at a specific frequency. That is, to this end, the operation section 192 of the LIDAR device 10 may include a calculator for applying a signal process to the laser beam received in the operation section 192. In this regard, detailed descriptions will be made below with reference to FIG. 8.

Figure 3:
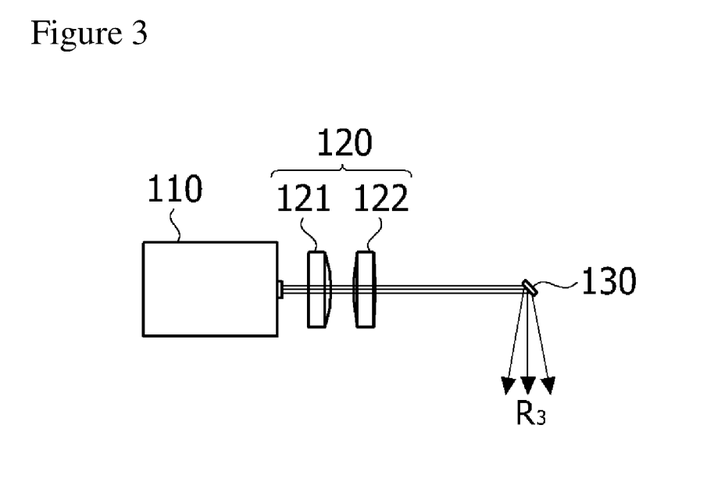
FIG. 3 is a view illustrating a transmitter, a first lens section and a reflector in the LIDAR device according to one embodiment.
Figure 4A:
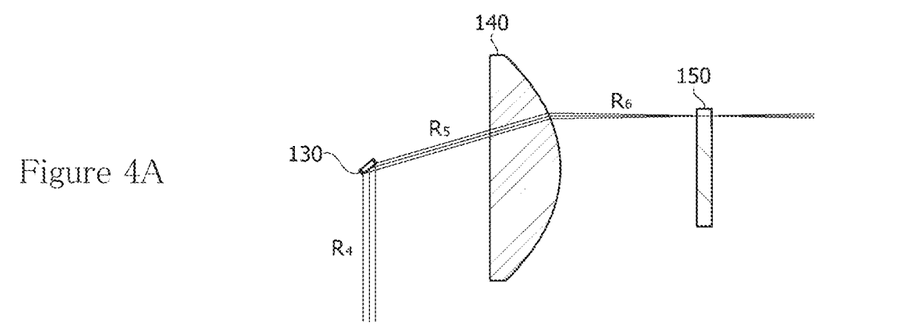
FIG. 4A is a view illustrating the reflector, a second lens section and a focuser in the LIDAR device according to one embodiment.
Figure 4B:
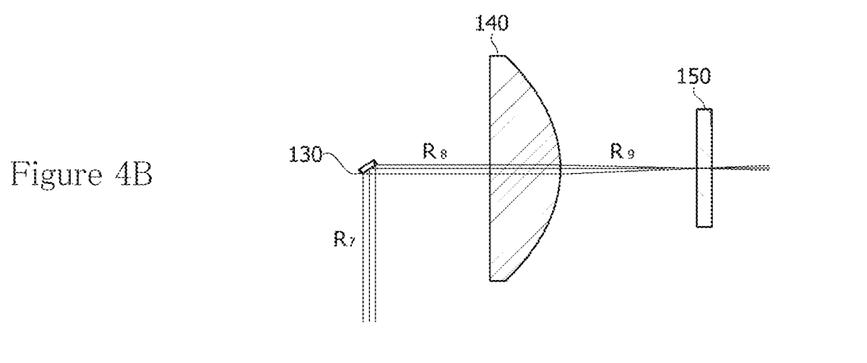
FIG. 4B is another view illustrating the reflector, a second lens section and a focuser in the LIDAR device according to one embodiment.
Figure 4C:
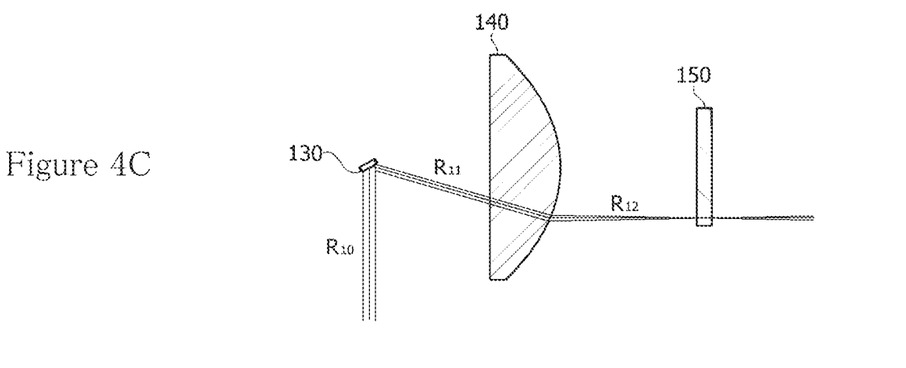
FIG. 4C is yet another view illustrating the reflector, a second lens section and a focuser in the LIDAR device according to one embodiment.
Figure 5:
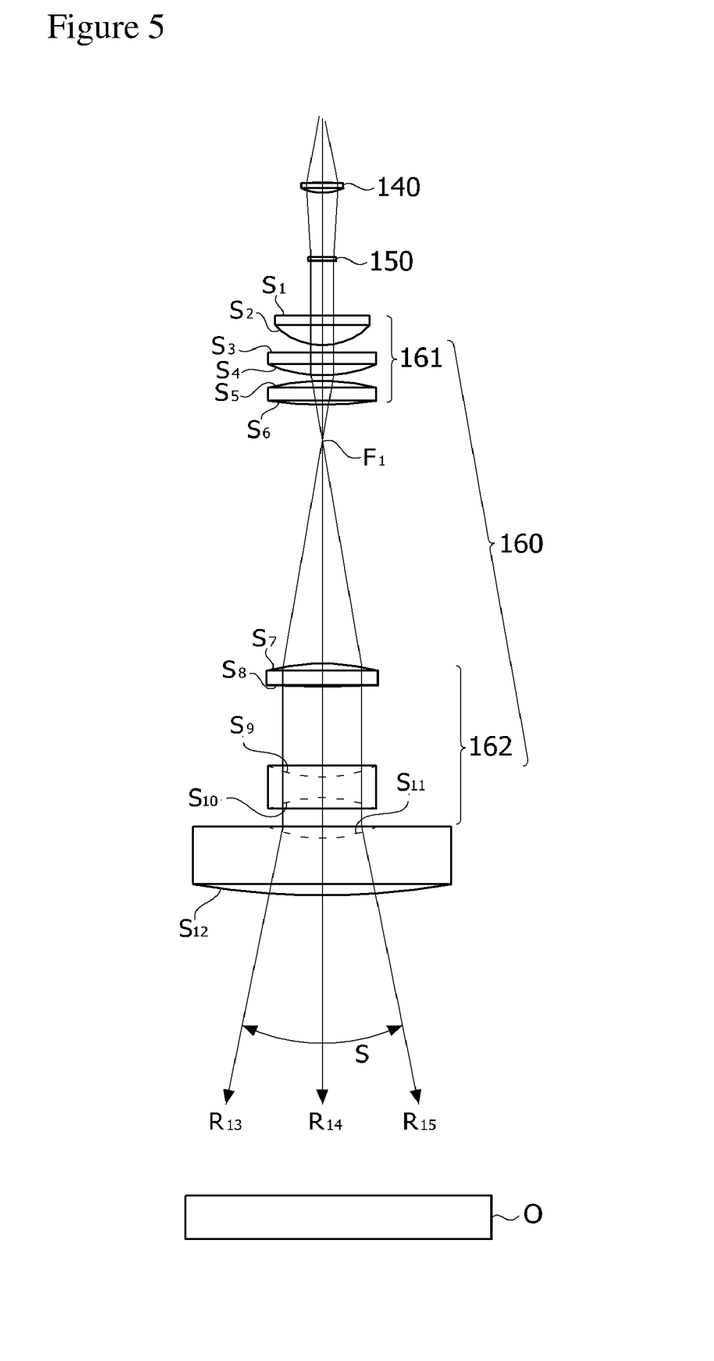
FIG. 5 is a view illustrating the second lens section, the focuser and a third lens section in the LIDAR device according to one embodiment.
Figure 6:
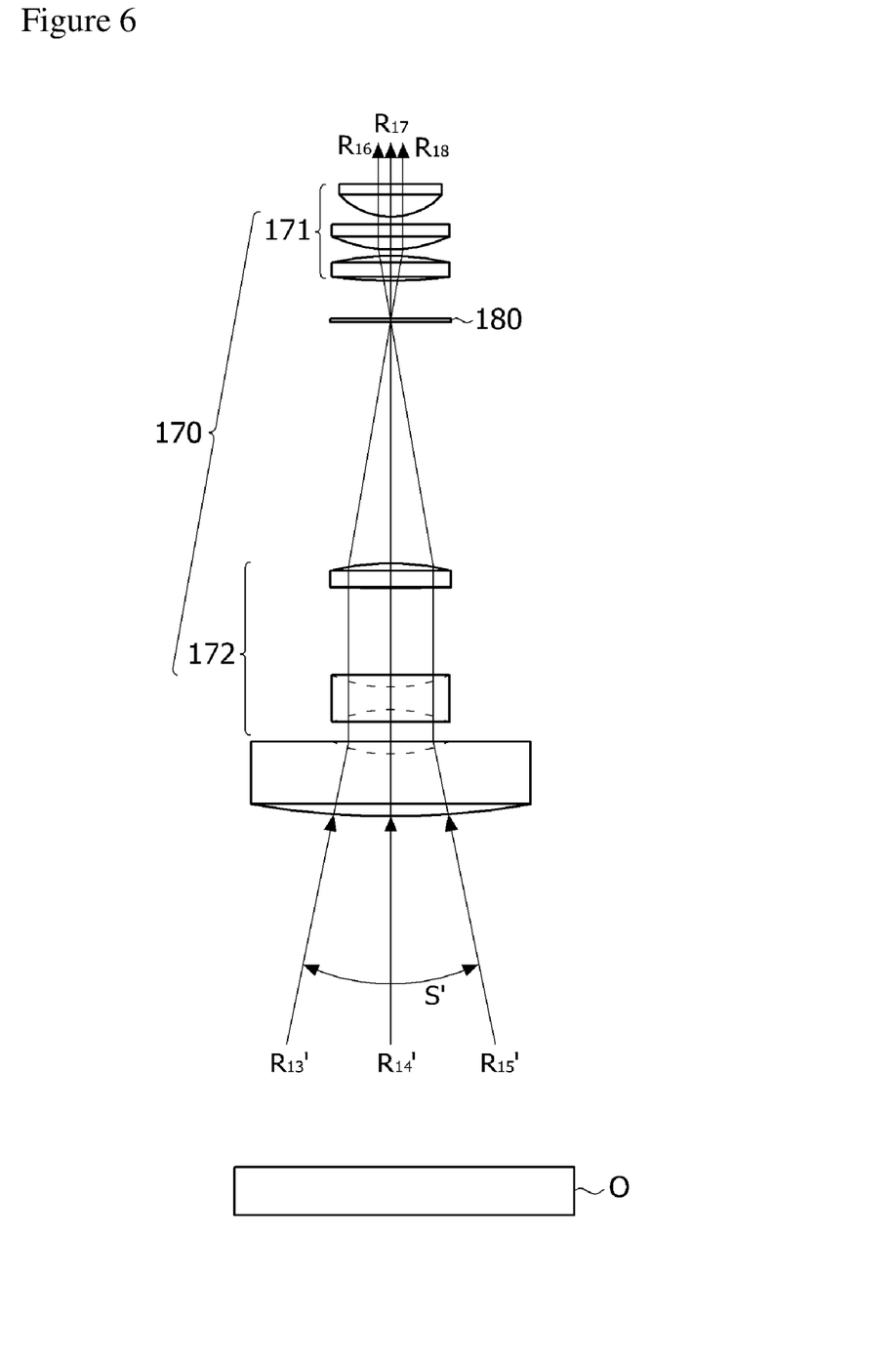
FIG. 6 is a view illustrating a fourth lens section and an aperture in the LIDAR device according to one embodiment.
Figure 7:
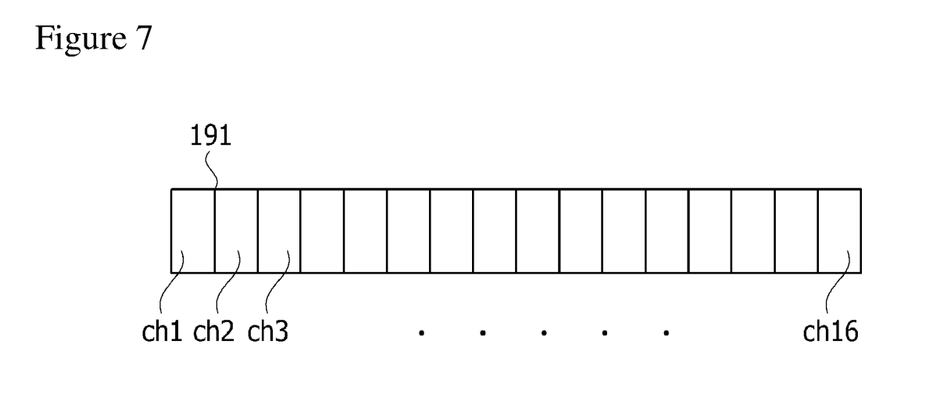
FIG. 7 is a view illustrating a channel section in the LIDAR device according to one embodiment.
Figure 8:
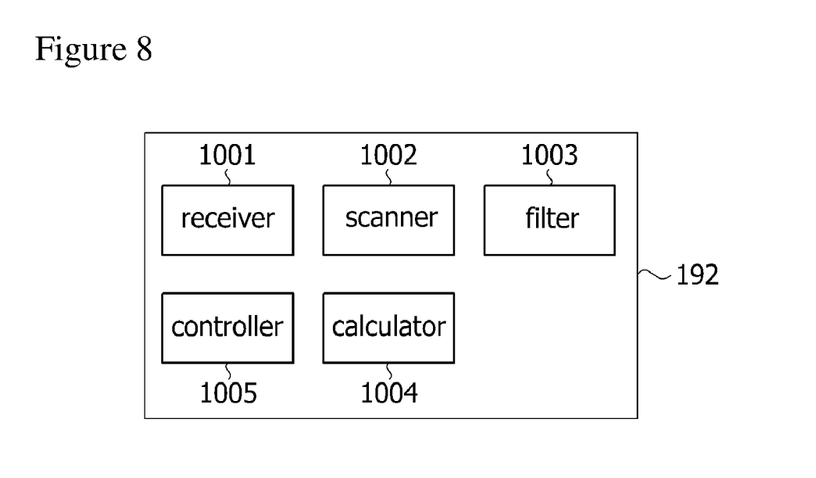
FIG. 8 is a view illustrating an operation section in the LIDAR device according to one embodiment.

FIG. 3 is a view illustrating a transmitter, a first lens section and a reflector in the LIDAR device according to one embodiment, FIG. 4A, FIG. 4B and FIG. 4C are views illustrating the reflector, a second lens section and a focuser in the LIDAR device according to one embodiment, FIG. 5 is a view illustrating the second lens section, the focuser and a third lens section in the LIDAR device according to one embodiment, FIG. 6 is a view illustrating a fourth lens section and an aperture in the LIDAR device according to one embodiment, FIG. 7 is a view illustrating a channel section in the LIDAR device according to one embodiment, and FIG. 8 is a view illustrating an operation section in the LIDAR device according to one embodiment, First, referring to FIG. 3, the transmitter 110 may be arranged so that the optical axis of the output laser beam can be aligned with the first lens section 120. According to one embodiment, as described above, the first signal passed through the first lens section 120 may be collimated light.

Further, the first signal passed through the first lens section 120 may be reflected from the reflector 130. The first signal R3 reflected from the reflector 130 may be reflected in many directions according to the tilting angle of the reflector 130. For example, if the reflector 130 has a tilting angle of 0 degrees, the first signal passed through the first lens section 120 may be reflected in a direction perpendicular to an incident angle on the reflector 130. For example, if the reflector 130 has a tilting angle of 0 degrees, the first signal R3 reflected from the reflector 130 may form an optical path in the same direction as the second direction. In addition, the reflector 130 may be tilted toward one side in the first direction, contrasting with having the tilting angle of 0 degrees. In this case, the reflector 130 may have a negative tilting angle. For example, the tilting angle of the reflector 130 may be formed up to −6 degrees. Further, the reflector 130 may be tilted toward the other side in the first direction, contrasting with having the tilting angle of 0 degrees. In this case, the reflector 130 may have a positive tilting angle. For example, the tilting angle of the reflector 130 may be formed up to +6 degrees. The first signal R3 reflected from the reflector 130 may form optical paths in various directions according to the tilting angle of the reflector 130. Further, the first signal R3 reflected from the reflector 130 may be collimated light.

FIG. 4A, FIG. 4B and FIG. 4C show the respective optical paths of the first signal when the reflector 130 is tilted in the positive direction as far as possible (FIG. 4A), when the reflector 130 is tilted at 0 degrees (FIG. 4B), and when the reflector 130 is tilted in the negative direction as far as possible (FIG. 4C).

The first signals R4, R7, and R10 incident on the reflector 130 may be reflected toward the second lens section 140 as the reflector 130 is tilted. The first signals R5, R8, and R11 incident on the second lens section 140 may have optical paths of parallel angles which vary displacement in the second lens section 140. Further, the first signals R6, R9, and R12 passed through the second lens section 140 may be converted to be focused at the same distance. With this configuration, the light reflected from the reflector 130 may be incident on the second lens section 140 at different displacements while maintaining the collimated light. Further, the first signals passed through the second lens section 140 may form different displacements according to the angle of the reflector 130, while having the same distance from the second lens section 140 on the focuser 150 (on the same plane). That is, the first signals varied in displacement depending on the tilting angle of the reflector 130 may be focused on the focuser 150. In addition, the scan angle may be improved by the first signals passed through the focuser 150 and having different displacements.

Referring to FIG. 5, the focuser 150 may be formed so that the first signals R13, R14, and R15 passed through the second lens section and varied depending on the tilting angle of the reflector can be focused on the focuser 150 while having different displacements. In addition, the focuser 150 may be arranged at a back focal distance of the third lens section 160. Accordingly, the LIDAR device 10 according to one embodiment may detect the size of the real image on the focuser 150, and enlarges the size of each channel in the channel section 191 so as to be greater than the size of the real image of the each light beam on the focuser 150 as described above, thereby improving receiving efficiency.

Further, various first signals R13, R14, and R15 may be condensed through the 3-1 lens section 161 and focused at a first point F1. In addition, various first signals R13, R14, and R15 may pass through the first point F1.

In addition, various first signals R13, R14, and R15 may be converted into collimated light after passing through the third lens section 160, and have an increased wide angle through the third lens section 160. By way of example, as described above, the tilting angle of the reflector may range from −6 degrees to 6 degrees.

On the other hand, the total angle, within which the first signal passed through the third lens section 160 is output to the object O, may be 120 degrees or greater. Thus, the scan angle S may be 120 degrees or greater. With this configuration, the reflector including a subminiature MEMS mirror may be used to drastically improve the scan angle. Further, the first signal may maintain the collimated light even when it is reflected from the reflector and has an increased wide angle through the third lens section. Therefore, the LIDAR device according to one embodiment is significantly improved in optical efficiency. Moreover, it is possible to manufacture a small LIDAR device, and remove defects due to wear, a gap, etc. because there is no mechanical rotation.

Further, the 3-1 lens section 161 according to one embodiment may include three convex lenses. The maximum distance between the top surface S1 and the bottom surface S2 of the first convex lens may range from 5 mm to 10 mm. The maximum distance between the top surface S3 and the bottom surface S4 of the second convex lens may range from 5 mm to 10 mm. The maximum distance between the top surface S5 and the bottom surface S6 of the third convex lens may range from 5 mm to 10 mm.

A distance between the bottom surface S2 of the first convex lens and the top surface S3 of the second convex lens may range from 1 mm to 3 mm. A distance between the bottom surface S4 of the second convex lens and the top surface S5 of the third convex lens may range from 1 mm to 3 mm. In addition, a distance between the bottom surface S6 of the third convex lens and the first point F1 may range from 15 mm to 20 mm. In addition, a distance between the first point F1 and the top surface S7 of the first concave lens may range from 50 mm to 70 mm.

Further, the 3-2 lens section 162 according to one embodiment may include three concave lenses. The maximum distance between the top surface S7 and the bottom surface S8 of the first concave lens may range from 5 mm to 10 mm. The maximum distance between the top surface S9 and the bottom surface S10 of the second concave lens may range from 5 mm to 10 mm. The maximum distance between the top surface S11 and the bottom surface S12 of the third concave lens may range from 5 mm to 20 mm. Further, a distance between the bottom surface S8 of the first concave lens and the top surface S9 of the second concave lens may range from 25 mm to 30 mm. A distance between the bottom surface S10 of the second concave lens and the top surface S11 of the third concave lens may range from 15 mm to 30 mm.

Here, the first convex lens is a lens nearest the reflector 130 in the second direction, and the third convex lens is a lens nearest the object O in the second direction. In addition, the first concave lens is a lens nearest the reflector 130 in the second direction, and the third concave lens is a lens nearest the object O in the second direction. The second convex lens is arranged in between the first convex lens and the third convex lens, and the second concave lens is arranged in between the first concave lens and the third concave lens. Further, the top surface is one side of the lens nearest the reflector 130, and the bottom surface is one side of the lens nearest the object O.

Referring to FIG. 6, various first signals R13, R14, and R15 may be reflected from the object O. Various first signals R13', R14', and R15' reflected from the object O may pass through the fourth lens section 170. As described above, the fourth lens section 170 may include the 4-1 lens section 171 and the 4-2 lens section 172, in which the 4-1 lens section 171 is formed with the same lens as the 3-1 lens section 161 on the same line in the second direction, and the 4-2 lens section 172 is formed with the same lens as the 3-2 lens section 162 on the same line in the second direction.

Thus, various first signals R13', R14', and R15' reflected from the object O within the fourth lens section 170 may have an opposite traveling direction but the same optical path as the first signal within the third lens section 160.

Further, the receiver 190 including the channel section 191 having multiple channels may be arranged behind the fourth lens section 170. In addition, the channel section 191 is arranged at the back focal length of the fourth lens section 170, which will be described below, and the channel section 191 may be positioned on the same line as the focuser 150 in the second direction. Accordingly, the focuser 150 can adjust a position, at which the optical signal is received, in the channel section 191 according to the displacement of the optical signal. Thus, the LIDAR device according to one embodiment may be easily switched to split the optical signal received through the plurality of channels. Therefore, it is possible to reduce power consumption by controlling only the channel for receiving the optical signal among the plurality of channels without a multi-channel transmitter. Further, the receiver 190 may include a field-programmable gate array (FPGA). In addition, the FPGA may improve a switching logic speed. Therefore, the LIDAR device according to one embodiment may provide a video signal of high resolution.

Further, the LIDAR device according to one embodiment may provide a united structure between a path of an optical signal to be transmitted and a path of an optical signal to be received, by optical and electronic features. Further, the LIDAR device according to one embodiment may provide a united structure between a lens for an optical path of transmitting light and a lens for an optical path of receiving light. Thus, the lens may be easily mass-producted. Further, the description for the third lens section 160 may be equally applied to features of each lens in the 4-1 lens section 171 and the 4-2 lens section 172, such as thickness or the like.

The aperture 180 may be arranged on the same line as the first point F1 in the second direction. Thus, the aperture 180 may control various first signals R16, R17, and R18 received in the receiver 190 to have a uniform amount of light regardless of the angle of the reflector 130. Thus, the LIDAR device according to one embodiment is improved in accuracy.

Referring to FIG. 7 and FIG. 8, the channel section 191 may include the plurality of channels, but is not limited thereto. Further, the channel section 191 may include a plurality of light receiving elements, but there is no limit to the number of light receiving elements.

For example, the channel section 191 may include 16 channels ch1 to ch16. For example, the channel section 191 may include a first channel ch1 to a sixteenth channel ch16. In addition, if the scan angle is 120 degrees, the first channel ch1 may receive the first signal reflected from the object O within the scan angle ranging from −60 degrees to −52.5 degrees. Further, the second channel ch2 may receive the first signal reflected from the object O within the scan angle ranging from −52.5 degrees to −45 degrees. In addition, the third channel ch3 may receive the first signal reflected from the object O within the scan angle ranging from −45 degrees to −37.5 degrees. The fourth channel ch4 may receive the first signal reflected from the object O within the scan angle ranging from −37.5 degrees to −30 degrees. The fifth channel ch5 may receive the first signal reflected from the object O within the scan angle ranging from −30.0 degrees to −22.5 degrees. The sixth channel ch6 may receive the first signal reflected from the object O within the scan angle ranging from −22.5 degrees to −15 degrees. The seventh channel ch7 may receive the first signal reflected from the object O within the scan angle ranging from −15 degrees to −7.5 degrees. The eighth channel ch8 may receive the first signal reflected from the object O within the scan angle ranging from −7.5 degrees to 0 degrees. The ninth to sixteenth channels ch9 to ch16 may receive the first signal reflected from the object O within the scan angles having positive ranges in the scan angles for the eighth channel ch8 to the first channel ch1. However, the scan angles may be varied depending on the number of channels in the channel section 191.

Further, corresponding to the scan angle, the first channel may receive the first signal reflected from the object O when the reflector 130 has a tilting angle of +6 degrees. In addition, the sixteenth channel may receive the first signal reflected from the object O when the reflector 130 has a tilting angle of −6 degrees.

The channel section 191 may be connected with the operation section 192. The operation section 192 may include a receiver 1001, a scanner 1002, a filter 1003, a calculator 1004 and a controller 1005.

The operation section 192 may be installed in the receiver 190, but is not limited thereto. The operation section 192 may control switching of the channel of the channel section 191 in accordance with the tilting angle of the reflector 130.

First, the receiver 1001 may include a signal splitter including a plurality of switching elements. For example, the receiver 1001 may be a multiplexer, but is not limited thereto. The receiver 1001 may be connected to each of the channels ch1 to ch16 of the channel section 191. For example, the receiver 1001 may separate and receive only one of the signals received from the channels of the channel section 191. The receiver 1001 may receive only the signal received from the channel corresponding to a control signal received from the controller 1005.

The scanner 1002 may transmit the scan angle corresponding to the tilting angle of the reflector 130 from the controller 1005. The range of the scan angle corresponding to the tilting angle may include previously stored data.

The filter 1003 may compensate distortion of the signal. For example, if light having a pulse waveform is transmitted from the transmitter 110, the filter 1003 may compensate signal distortion in output light passing through the first lens section 120, the reflector 130, the second lens section 140, the focuser 150, the third lens section 160, the fourth lens section 170, and the receiver 190. For example, the filter 1003 may include a Bessel filter. The filter 1003 may be arranged in between the channel section 191 and the fourth lens section 170.

The controller 1005 may use, for example, a multiplexer to separate and receive the channel corresponding to the scan angle received from a scanner 1002. With this configuration, the LIDAR device according to one embodiment separates only a signal corresponding to a desired channel, and blocks signal reception of the channels not corresponding to the scan angle, thereby improving power efficiency and heat-generation efficiency. That is, the controller 1005 may transmit a control signal to the receiver 1001 with respect to the channel corresponding to the scan angle of the scanner 1002.

The calculator 1004 may calculate a distance from the object O based on the number of times or time of receiving a signal received in the receiver 1001. For example, the calculator 1004 may receive information about the channel of the signal received in the receiver 1001 from the controller 1005, and calculate the location of the object by obtaining the scan angle. In addition, the calculator 1004 may include a time to digital converter (TDC). Thus, the calculator 1004 may measure a time interval between the received signals and generate a digital signal. The calculator 1004 may use the generated digital signal to calculate a distance from the object O. For example, the calculator 1004 may calculate the travel time of light based on the number of generated digital signals. Here, the time interval per generated digital signal may be set by a user and the like. Further, the channel includes a plurality of light receivers, and areas may be divided according to the light receivers. Thus, the calculator 1004 may calculate the angle with respect to the object based on the area corresponding to the received signal. Therefore, the calculator 1004 may calculate the distance, angle, etc. with respect to the object O, thereby outputting a shape.

The operation section 192 may additionally include a communicator (not shown). The output signal about the distance, the angle, etc. regarding the object O, which is calculated in the calculator 1004, may be transmitted to the outside or the like. The communicator (not shown) may include various wired or wireless communication modules.

For example, the communicator (not shown) may include a user datagram protocol (UDP), but is not limited thereto.

Figure 9:
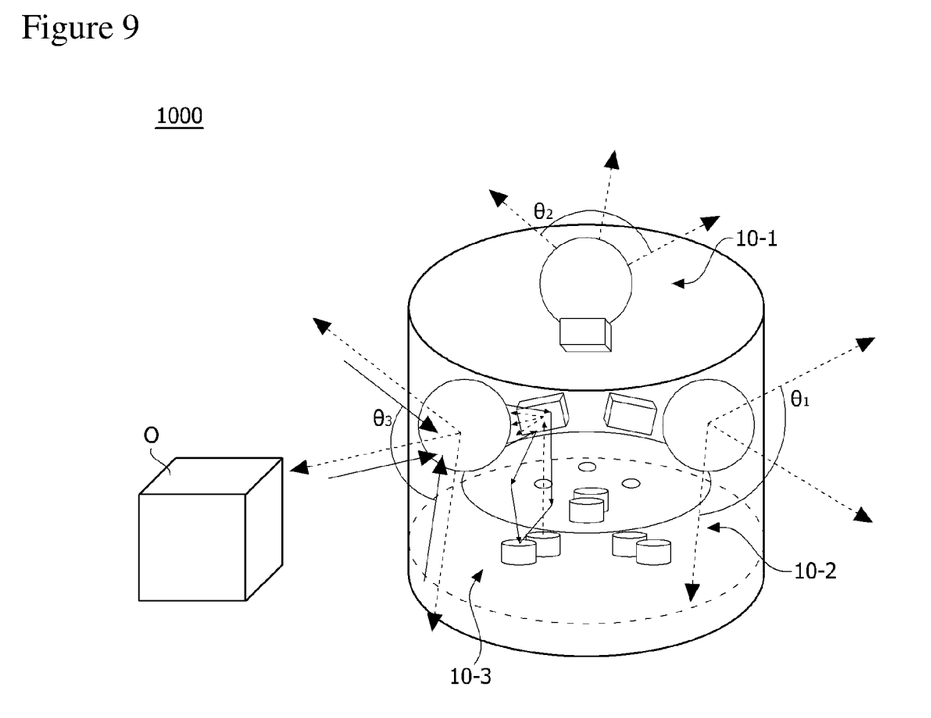
FIG. 9 is a view illustrating an LIDAR system according to another embodiment.
Figure 10:
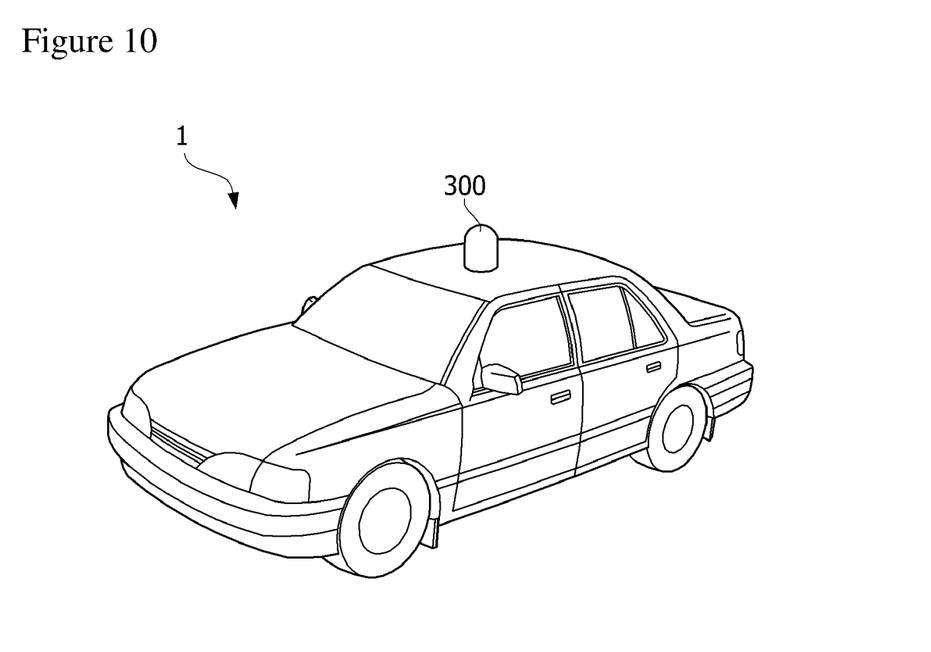
FIG. 10 shows an example that the LIDAR device according to one embodiment of the present disclosure is mounted on a vehicle.

FIG. 9 is a view of illustrating an LIDAR system according to another embodiment, and FIG. 10 shows an example that the LIDAR device according to one embodiment of the present disclosure is mounted on a vehicle.

FIG. 9 is a view of illustrating an LIDAR system according to another embodiment.

Referring to FIG. 9, an LIDAR system 1000 according to one embodiment may include a plurality of LIDAR devices 10-1, 10-2, and 10-3. The LIDAR system 1000 includes the plurality of LIDAR devices 10-1, 10-2 and 10-3, and is capable of performing an omnidirectional scan of 360 degrees.

By way of example, the LIDAR system 1000 may include three LIDAR devices 10-1, 10-2, and 10-3. Each of the LIDAR devices 10-1, 10-2, and 10-3 may scan as much as an angle θ1, θ2, and θ3 of 120 degrees except an overlapping area. With this configuration, each of the LIDAR devices 10-1, 10-2, and 10-3 may be individually controlled and perform signal processing, thereby having effects of miniaturization, low power-consumption, and low costs.

FIG. 10 shows an example that the LIDAR device according to one embodiment of the present disclosure is mounted to a vehicle.

Referring to FIG. 10, an LIDAR device 300 according to one embodiment of the present disclosure may be mounted on a top end of a car body, and thus not only a front scan of a vehicle 1 but also an onimidirectional scan of 360° is performed.

Although exemplary embodiments of the present disclosure have been described in detail, it will be appreciated by a person having an ordinary skill in the art that various changes and applications may be made in the foregoing exemplary embodiments without departing from the intrinsic features of the present disclosure. For example, elements specifically shown in the embodiments may be modified. In addition, differences related to such changes and applications may be included in the scope of the present disclosure defined in the following claims and their equivalents.

What is claimed is:

1. A light detection and ranging (LIDAR) device comprising:
   a transmitter configured to emit an optical signal;
   a first lens section configured to convert the optical signal into collimated light;
   a reflector configured to adjust a direction of the converted optical signal;
   a second lens section configured to allow the adjusted optical signal to have a same focal plane even when a reflection angle of the reflector is varied;
   a third lens section configured to convert the optical signal passed through the second lens section into collimated light;
   a fourth lens section configured to allow the optical signal, which has been passed through the third lens section and reflected from an object, to be passed therethrough;
   a receiver configured to receive the optical signal passed through the fourth lens section; and
   a focuser positioned on the same focal plane,
   wherein the third lens section and the fourth lens section are positioned on the same line in a first direction,
   wherein the first direction is perpendicular to a second direction, wherein the second direction comprises a direction from the third lens section toward the object, wherein the receiver comprises:
a channel section configured to receive an optical signal passed through the fourth lens section; and
an operation section configured to calculate a distance from the object based on the optical signal received in the channel section, wherein the channel section includes multiple channels, wherein a receiving channel of the multiple channels varies depending on the reflection angle of the reflector, and wherein the channel section is positioned on the same straight line as the focuser in the second direction perpendicular to the first direction.

2. The LIDAR device of claim 1, wherein the optical signal comprises collimated light between the first lens section and the second lens section, between the third lens section and the object, and between the object and the fourth lens section.

3. The LIDAR device of claim 1, wherein:
the optical signal has a first path which is in the second lens section and a second path which is in the fourth lens section, and
the first path and the second path are parallel with the second direction.

4. The LIDAR device of claim 3, wherein the first path and the second path are opposite in a direction of the optical signal.

5. The LIDAR device of claim 1, wherein the channel section is positioned on the same focal plane.

6. The LIDAR device of claim 1, wherein the channel section comprises a plurality of channels comprising a plurality of light receiving elements.

7. The LIDAR device of claim 6, wherein the operation section receives the optical signal passed through the fourth lens section by selecting the plurality of channels corresponding to the direction of the reflector.

8. The LIDAR device of claim 1, wherein a tilting angle of the reflector is adjusted to compensate optical aberration.

9. The LIDAR device of claim 1, wherein the reflector comprises a microelectromechanical system (MEMS) mirror.

10. The LIDAR device of claim 1, wherein the focuser is disposed between the second lens section and the third lens section.

11. The LIDAR device of claim 1, wherein the reflector, the second lens section, the focuser and the third lens section are aligned in the first direction in this order.

12. A light detection and ranging (LIDAR) system comprising an LIDAR device for scanning a plurality of areas, the LIDAR device comprising:
a transmitter configured to emit an optical signal;
a first lens section configured to convert the optical signal into collimated light;
a reflector configured to adjust a direction of the converted optical signal;
a second lens section configured to allow the adjusted optical signal to have a same focal plane even when a reflection angle of the reflector is varied;
a third lens section configured to convert the optical signal passed through the second lens section into collimated light;
a fourth lens section configured to allow the optical signal, which has been passed through the third lens section and reflected from an object, to be passed therethrough;
a receiver configured to receive the optical signal passed through the fourth lens section; and
a focuser positioned on the same focal plane,
wherein the third lens section and the fourth lens section are positioned on the same line in a first direction,
wherein the first direction is perpendicular to a second direction,
wherein the second direction comprises a direction from the third lens section toward the object,
wherein the receiver comprises:
a channel section configured to receive an optical signal passed through the fourth lens section; and
an operation section configured to calculate a distance from the object based on the optical signal received in the channel section,
wherein the channel section includes multiple channels,
wherein a receiving channel of the multiple channels varies depending on the reflection angle of the reflector, and
wherein the channel section is positioned on the same straight line as the focuser in the second direction perpendicular to the first direction.

13. The LIDAR system of claim 12, wherein the focuser is disposed between the second lens section and the third lens section.

14. The LIDAR system of claim 12, wherein the reflector, the second lens section, the focuser and the third lens section are aligned in the first direction in this order.

* * * * *